(12) United States Patent
Iversen (10) Patent No.: US 7,363,270 B2
(45) Date of Patent: Apr. 22, 2008

(54) SYSTEM AND METHOD FOR SETTLING TRADES IN A DIGITAL MERCHANT EXCHANGE (75) Inventor: Jorn Iversen, Toronto (CA)

(73) Assignee: ASF Financial Corporation, Tillsonburg, Ontario (CA)

( * ) Notice: Subject to any disclaimer, the term of this patent is extended or adjusted under 35 U.S.C. 154(b) by 1383 days.

(21) Appl. No.: 09/788,208

(22) Filed: Feb. 16, 2001

(65) Prior Publication Data

US 2004/0044620 A1 Mar. 4, 2004

(51) Int. Cl.
*G06Q 40/00* (2006.01)
(52) U.S. Cl. .............................. 705/37; 705/35; 705/39
(58) Field of Classification Search .................. 705/35, 705/7, 1, 37, 39, 40; 713/176, 193
See application file for complete search history.

(56) References Cited

U.S. PATENT DOCUMENTS

| | | | | |
|---|---|---|---|---|
| 5,615,268 A | | 3/1997 | Bisbee et al. | 713/176 |
| 5,694,552 A | | 12/1997 | Aharoni | 705/37 |
| 5,748,738 A | | 5/1998 | Bisbee et al. | 713/176 |
| 5,963,923 A | * | 10/1999 | Garber | 705/37 |
| 6,105,007 A | * | 8/2000 | Norris | 705/38 |
| 6,167,385 A | | 12/2000 | Hartley-Urquhart | 705/35 |
| 6,625,583 B1 | * | 9/2003 | Silverman et al. | 705/36 R |
| 7,155,409 B1 | * | 12/2006 | Stroh | 705/37 |

* cited by examiner

*Primary Examiner*—Ella Colbert (57) ABSTRACT

A system and method for settling trades in a digital merchant exchange includes a buyer, a seller, a transaction agent, a network and a capital pool. The buyer and seller communicate through the network to agree on a contract. When the goods are received or the services are performed, the buyer issues a negotiable instrument that is received by the transaction agent. The transaction agent communicates with the buyer, seller, and capital pool through the network and facilitates the settlement of the trade. The system may call upon the capital pool to provide liquidity so that the system can issue payment to the seller at a time prior to the maturity date of the negotiable instrument.

53 Claims, 8 Drawing Sheets

SYSTEM AND METHOD FOR SETTLING TRADES IN A DIGITAL MERCHANT EXCHANGE

BACKGROUND OF THE INVENTION

The present invention relates to a system and method for settling purchases of goods and services between a buyer and a seller.

When a buyer purchases goods from a seller, the buyer generally acknowledges receipt of the goods and then begins the process to pay the seller. The process may include awaiting an invoice from the seller, checking the invoice against goods received, sending the invoice to an accounts payable department, and then sending a check from the buyer's account on a payment date usually delayed significantly from the date of performance. This delay creates an obvious financial disadvantage for the seller.

The buyer, who may record numerous transactions daily, must record receipt of the goods for each invoice and follow each invoice through the accounts payable department until payment is sent on the payment date. Furthermore, the buyer's accounts payable department may be further frustrated by receiving orders on the same day that have different payment dates and many different sellers. Thus, the buyer is burdened with tracking invoices and creating payments to numerous different sellers as a daily course of business.

SUMMARY OF THE INVENTION

A system and method for settling trades in a digital merchant exchange includes a buyer, a seller, a transaction agent, a network and a capital pool. The buyer and seller communicate through the network to agree on a contract. When the goods are received or the services are performed, the buyer issues a negotiable instrument that is received by the transaction agent. The transaction agent communicates with the buyer, seller, and capital pool through the network and facilitates the settlement of the trade. The system may call upon the capital pool to provide liquidity so that the system can issue payment to the seller at a time prior to the maturity date of the negotiable instrument.

One aspect of the invention comprises an apparatus and method for providing liquidity to a seller who has provided value to a buyer. The apparatus includes a receiving module, and a calling module. The receiving module is configured to receive a negotiable instrument from the buyer. The calling module is configured to call upon a capital pool to purchase an interest in the negotiable instrument and to send a portion of the value of the negotiable instrument to the seller prior to the maturity date of the negotiable instrument.

Another aspect of the invention provides an apparatus and method for distributing payment to a seller who provides value for a contract. The apparatus comprises a negotiable instrument, a notification, a verification module, a certification module, and an order. The notification comprises a receipt of the consideration from the seller. The verification module is configured to verify that the negotiable instrument and the notification are responsive to the consideration. The certification module is configured to present the verified negotiable instrument and the notification to the seller prior to the maturity date of the negotiable instrument. The order to pay the value of the certified negotiable instrument matures on the maturity date.

Yet another aspect of the invention provides an apparatus and method for extending the payment term to a buyer who has received value from a seller. The apparatus comprises a receiving module configured to receive a negotiable instrument, a certification module, and a liquidity module. The negotiable instrument is received from the buyer and has an extended maturity date. The certification module certifies that the negotiable instrument is responsive to the receipt of the value. The liquidity module is configured to liquidate the negotiable instrument. Thus, the seller receives funds before the maturity date of the negotiable instrument.

Another aspect of the invention provides an apparatus and method for providing liquidity to a seller who has provided value to a buyer. The apparatus includes a negotiable instrument, and money for the purchase of the negotiable instrument. The negotiable instrument is issued by the buyer and received by the seller for the value. The negotiable instrument has a maturity date on a future date and is redeemable from the buyer. The negotiable instrument is purchased from the seller where the amount of money tendered to the seller is a portion of the amount of money represented in the negotiable instrument.

DETAILED DESCRIPTION OF THE DRAWINGS

Figure 1:
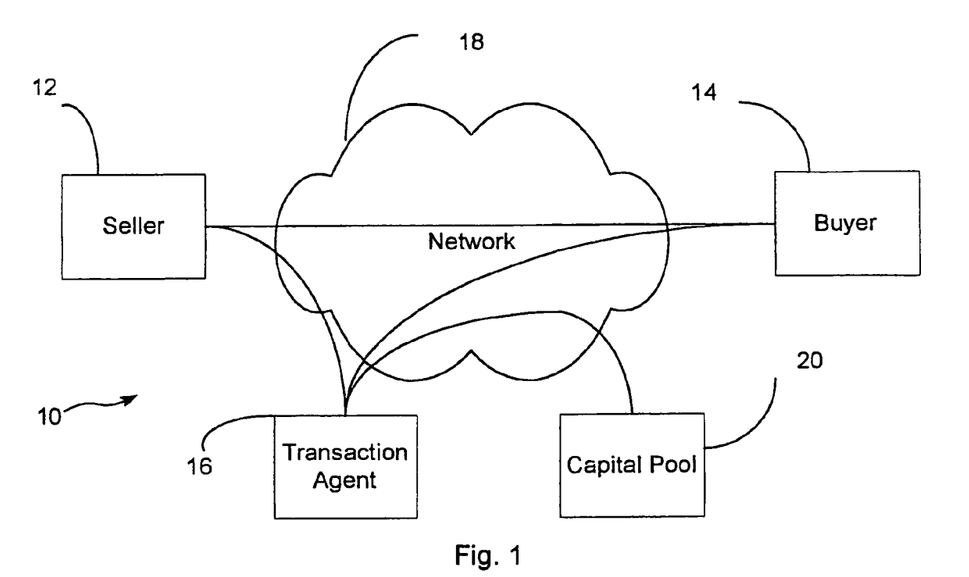
FIG. 1 is a schematic system diagram of the preferred embodiment of the present invention.

Turning now to the drawing figures, FIG. 1 is a schematic system diagram of the preferred embodiment of the present invention. A system 10 includes a seller 12, a buyer 14, a transaction agent 16, a network 18, and a capital pool 20. The buyer 14 and seller 12 communicate through the network 18 to agree on a contract. The transaction agent 16 communicates with the buyer 14, seller 12, and capital pool 20 through the network 18 to settle the trade established by the contract.

After the seller 12 completes the required performance under the contract between the buyer 14 and seller 12, the buyer 14 sends a notification and a promissory note (PN) to the transaction agent 16. The notification can include the price and quantity of the goods or services provided in the contract, or other relevant information. The PN is a negotiable instrument that is a promise to pay the amount of money stated on its face. The transaction agent 16 will then certify to the seller 12 that it has received the notification and the PN settling the amount referenced in the notification. This certification can take the form of an electronic certification such as a digital certification. The seller 12 may wait for the certified promissory note (CPN) to come to term and collect the payment for goods or services on the appropriate maturity date, or alternatively, may engage the transaction agent 16 to sell the CPN or an interest in the CPN on behalf of the seller 12.

In order to collect the money on the maturity date, the transaction agent 16 may also receive a bank draft before the maturity date of the CPN. The bank draft is an order to pay the amount of money for the CPN on the due date. The transaction agent 16 can thus secure the collection of the money on the due date by receiving the bank draft prior to the date the CPN matures. When the bank draft has been honored, the transaction agent 16 will disperse the funds to the interest holders of the CPN. Additionally, the bank draft may represent multiple transactions for the buyer. The transaction agent 16 may receive a bank draft that is an order to pay multiple transactions for one or more sellers 12.

The seller 12 can be a merchant who is selling goods or services to the buyer 14. The seller 12 negotiates a contract with the buyer 14. This contract may be formed through the network 18 or may be completed off line. Once the seller 12 delivers the goods or services to the buyer 14, the seller 12 receives the certification from the transaction agent 16 confirming the buyer's acknowledgement of performance of the contract, as well as confirmation of receipt of the PN equivalent to the monetary amount of the contract. The seller 12 then determines to wait for the maturity date of the CPN to occur, or to order the transaction agent 16 to sell the CPN or an interest in the CPN and deposit the proceeds from the sale into the seller's account. If the seller 12 waits for the maturity date of the CPN, then the transaction agent 16 performs a custodial function and maintains possession of the CPN until the maturity date at which time liquidity will be provided by the buyer.

If the seller 12 would rather have immediate access to liquidity, then the transaction agent 16 calls on the capital pool 20 to provide the liquidity to the seller 12. The capital pool 20 provides the liquidity for the transaction agent 16 to pay the seller 12, and thus the capital pool 20 purchases the CPN or an interest in the CPN. If the CPN is completely purchased by the capital pool 20, then the transaction agent 16 can retain custody of the CPN under an agency agreement with the transaction agent 16. The amount paid to the seller may be a portion of the total amount of the CPN or may be the entire portion of the CPN, depending on the agreement between the capital pool 20 and the seller 12. A portion of the CPN may be withheld as a holdback until the maturity date, and a finance fee may also reduce the payment amount. The transaction agent 16 can then deposit the payment amount into an account of the seller 12.

Accordingly, the transaction agent 16 knows the identity of the banking institutions for both the buyer 14 and the seller 12, and the appropriate account information for both of these participants. The transaction agent 16 presents the bank draft to the bank of the buyer 14 for collection. Following collection, the transaction agent 16 can then distribute the money to the seller 12, or to the interest holders of the CPN such as the capital pool.

The network 18 may comprise a number of smaller networks located between the capital pool 20, the seller 12, the buyer 14, and the transaction agent 16. For example, the seller 12 may communicate with the buyer 14 through a private buyer-seller network through a proprietary network architecture. The transaction agent 16 may contact the seller 12 through a local area network (LAN) that is isolated from the buyer-seller network, and may employ standard TCP/IP protocol. The buyer 14 may communicate with the transaction agent 16 through a wide area network (WAN) that connects a plurality of distribution centers of the buyer 14 so that the buyer 14 can track receipt of goods, or performance of services, at a number of processing facilities. Furthermore, these communications may be sent across the Internet using security measures, such as an SSL layer, to ensure a level of confidentiality. Thus, the generic network 18 may represent a number of smaller networks that may or may not facilitate communication between all of the participants.

Figure 2:
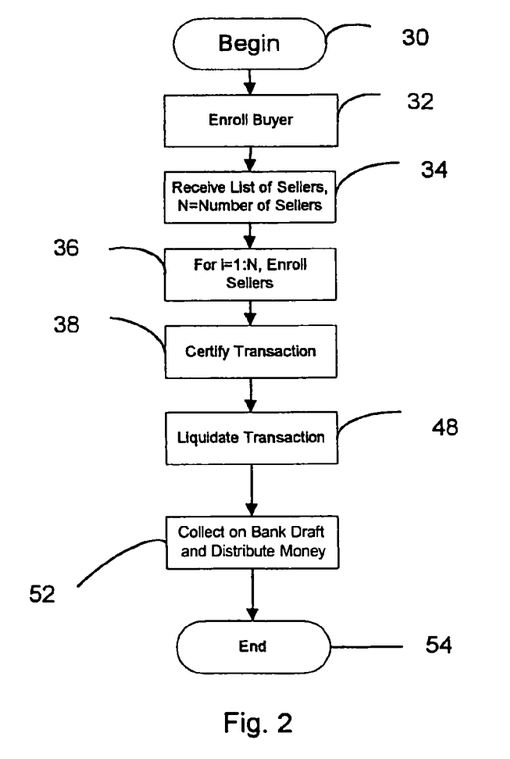
FIG. 2 is a flowchart showing steps of the preferred method of the present invention.

Turning now to FIG. 2, a flowchart showing steps of the preferred method of the present invention is shown leading up to the liquidation of a CPN will be described in further detail with reference to the system of FIG. 1. The method begins in step 30. The buyer 14 enrolls with the transaction agent 16 in step 32. The transaction agent 16 then receives a list of sellers from the buyer 14 in step 34. In step 36, the transaction agent 16 retrieves enrollment information for each of the sellers 12 on the list of sellers and enrolls the sellers with the transaction agent 16. The transaction agent 16 receives a notification from a buyer 16 and certifies that transaction in step 38. The transaction agent 16 then liquidates a part or all of the CPN according to the instructions of the seller 12 in step 48 and issues payment to the account of the seller 12. In step 52, the transaction agent 16 collects on the bank draft and disburses the funds according to the interest holders of the CPN. The method ends in step 54.

The setup steps 30, 32, 34, 36 include general information that is exchanged between the transaction agent 16 and the buyers 14 and sellers 12. The general information includes routing numbers for accounts, name and address of the business, and documentation for agency appointments between the buyer 14 and the transaction agent 16, and the seller 12 and the transaction agent 16. The setup steps 30, 32, 34, 36 initiate the relationships between the participants so that future trades may be settled by the transaction agent 16.

The certification step 38 verifies that the transaction has occurred by comparing the notification received from the buyer 14 to the PN sent by the buyer 14, and notifies the seller 12 that the promise to pay, in the form of the negotiable instrument, has been received by the transaction agent 16. These documents contain the information that settles a trade between the buyer 14 and the seller 12. The information may include the quantity of the goods, the price of the goods, the value of the services, a settlement date, buyer and seller business information, commodity taxes as computed by the buyer 14, and any other identifiers for the trade. The transaction agent 16 verifies these documents against one another so that the agent 16 may be sure that the documents represent the same trade. Thereafter, a CPN is generated and the seller 12 is then notified of the certification of the trade by the transaction agent 16. If the documents do not match, then the transaction agent 16 does not recognize the trade as a valid transaction. The transaction agent 16 awaits further promissory notes and notifications until a pair of these documents can be matched to form a trade.

The liquidation step 48 includes the steps taken by the transaction agent 16 to provide liquidity to the seller 12 against the value of the CPN. The transaction agent 16 then acts on behalf of the seller 12 to access the liquidity provided by the capital pool 20. The seller 12 may wish to collect the payment immediately or wait for the maturity date. If the seller wishes to liquidate the CPN prior to the maturity date, then the seller 12 will issue a notice to the transaction agent 16 to sell at least a portion of the CPN. The seller 12 may automate this process, in which case the transaction agent 16 does not have to wait for a decision by the seller 12. Instead the transaction agent 12 may immediately sell a portion of the seller's interest in the CPN to the capital pool 20 and issue the payment to the seller's account on behalf of the capital pool 20. On the maturity date, the transaction agent 16 collects the value of the PN by calling on the buyer to pay the value of the PN, and then the transaction agent 16 disburses the money to the interest holders of the CPN.

Figure 3:
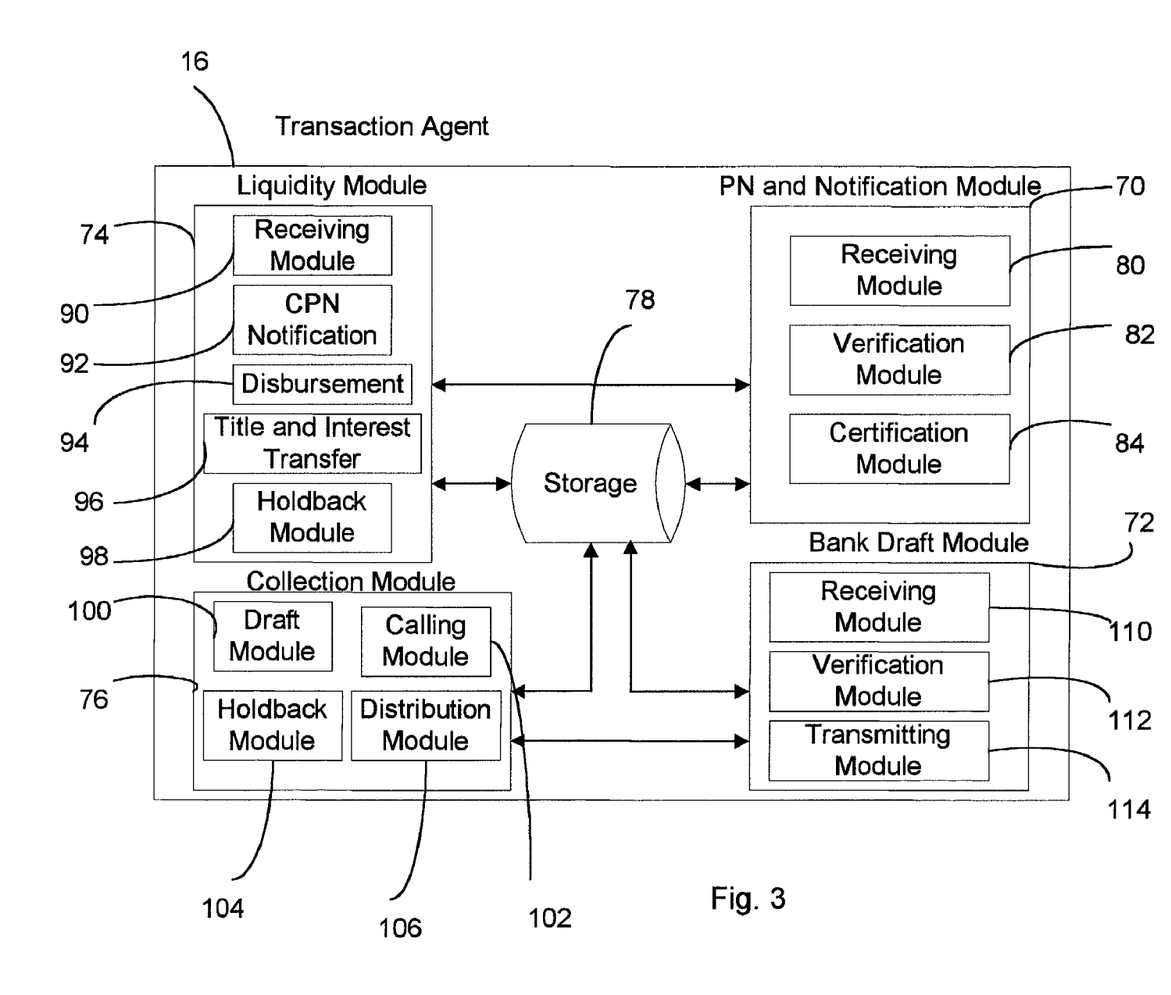
FIG. 3 is a schematic diagram of the transaction agent of FIG. 1.

FIG. 3 is a schematic diagram of the transaction agent 16 of FIG. 1 and will be described in further detail with regard to the system of FIG. 1. The transaction agent 16 includes a PN and notification module 70, a bank draft module 72, a liquidity module 74, a collection module 76, and storage 78. The PN and notification module 70 communicates with the buyer 14 to receive the PN and the notification, and then certify these documents. The bank draft module 72 receives a bank draft from the buyer 14, verifies the draft amount, and cashes the bank draft when the maturity date arrives. Once the trade is settled, then liquidity for the seller is provided through the liquidity module 74. The liquidity module 74 communicates with the seller 12 to determine the actions the seller 12 wants the transaction agent 16 to proceed to liquidate the CPN. The liquidity module also tracks the title of the CPN so that if the CPN is sold, the liquidity module 74 can update the title information. Similarly, the liquidity module 74 may also track interests in the CPN. Once the maturity date arrives, the collection module 76 communicates with the bank draft module 72 to secure the money from the account of the buyer 14 and distribute the money to the interest holders of the CPN.

The PN and notification module 70 includes a receiving module 80, a verification module 82 and a certification module 84. The receiving module 80 communicates with the buyer 14 and receives trade notifications and PNs that are sent from the buyer 14. The verification module 82 determines if the received PN or notification matches any of the previously stored notifications or PNs. If a PN and notification pair are found that match, then the certification module 84 certifies the trade and issues a CPN for the seller 12. The PN and notification are stored in storage 78 until the seller 12 determines whether he will liquidate the CPN prior to the maturity date or retain custody of the CPN until the maturity date arrives.

The liquidity module 74 includes a receiving module 90, a CPN notification module 92, a disbursement module 94, a title and interest transfer module 96, and a holdback module 98. The CPN notification module 92 transmits the certification to the seller 12. The receiving module 90 communicates with the seller 12 and receives instructions for holding or liquidating the CPN prior to the maturity date. The receiving module 90 may also receive an instruction from the seller 12 to automate the liquidation process and always sell a CPN. The disbursement module 94 transmits the money received from the capital pool 20 arising from the sale of a portion of the CPN to the seller's account. If the CPN was purchased outright by an interest in the capital pool 20, then the title and interest transfer module 96 transfers the title of the CPN from the seller 12 to that interest in the capital pool 20. If a portion of the CPN is purchased by an interest in the capital pool 20, then the liquidity module 74 will note the partial purchase and provide the information to the collection module 76 which distributes to the partial holder his portion when the maturity date arrives. The holdback module 98 manages the holdback during this period, and also forwards the holdback to the seller 12 on the maturity date of the CPN.

The collection module 76 includes a draft module 100, a calling module 102, a holdback module 104, and a distribution module 106. The draft module 100 notifies the bank draft module 72 when the maturity date arrives. The calling module 102 calls upon the capital pool 20 to provide liquidity to the transaction agent 16, who can then forward the liquidity to the seller 12. The distribution module 106 retrieves the bank draft from the storage 78, and receives the money from the bank draft module 72 when the draft is cashed. Once the money is received, then the distribution module 106 distributes the money to the interest holders of the CPN. The interest holders may be participants in the capital pool 20 or other investors who have otherwise purchased a part of the CPN. If a holdback was kept from the seller 12, then the holdback module 104 forwards the holdback to the liquidity module 74 when the money from the draft is received. The liquidity module 74 subsequently forwards the holdback to the seller 12. Once the money is collected and distributed the PN can be returned to the buyer 14 through the bank draft module 72.

The bank draft module 72 includes a receiving module 110, a verification module 112, and a transmitting module 114. The receiving module 110 receives from the buyer 14 a bank draft as future payment for the PN. The verification module 112 determines if the amount of the bank draft matches the amount of the CPNs that will mature on the date that the draft is issued for. If the amount is different, then the transmitting module 114 reports the error to the buyer 14. When the maturity date arrives, then the bank draft module 72 functions to collect the money for the draft.

The bank draft module 72 calls upon the buyer 14 on the maturity date to collect the money. The transmitting module 114 transmits the bank draft to the buyer's bank. The receiving module 110 receives the money from the buyer's bank. The verification module 112 determines if the money received represents the amount of the bank draft. Once the amount is verified, then the money is passed to the collection module 76 which distributes the money to the interest holders of the CPN. Once the obligations of the buyer 14 to the interest holders is satisfied, then the transmitting module 114 of the bank draft module 72 can return the PN to the buyer 14 so that the buyer 14 can retain proof that his obligations have been satisfied.

The transaction agent 16 thus includes modules that certify the CPN, liquidate the CPN, collect money on the bank drafts, and disburse the money to the interest holders of the CPN. In some embodiments, the storage 78 of the transaction agent 16 also includes secure storage so that these documents can be protected while the transaction agent 16 retains custody of the documents.

Figure 4:
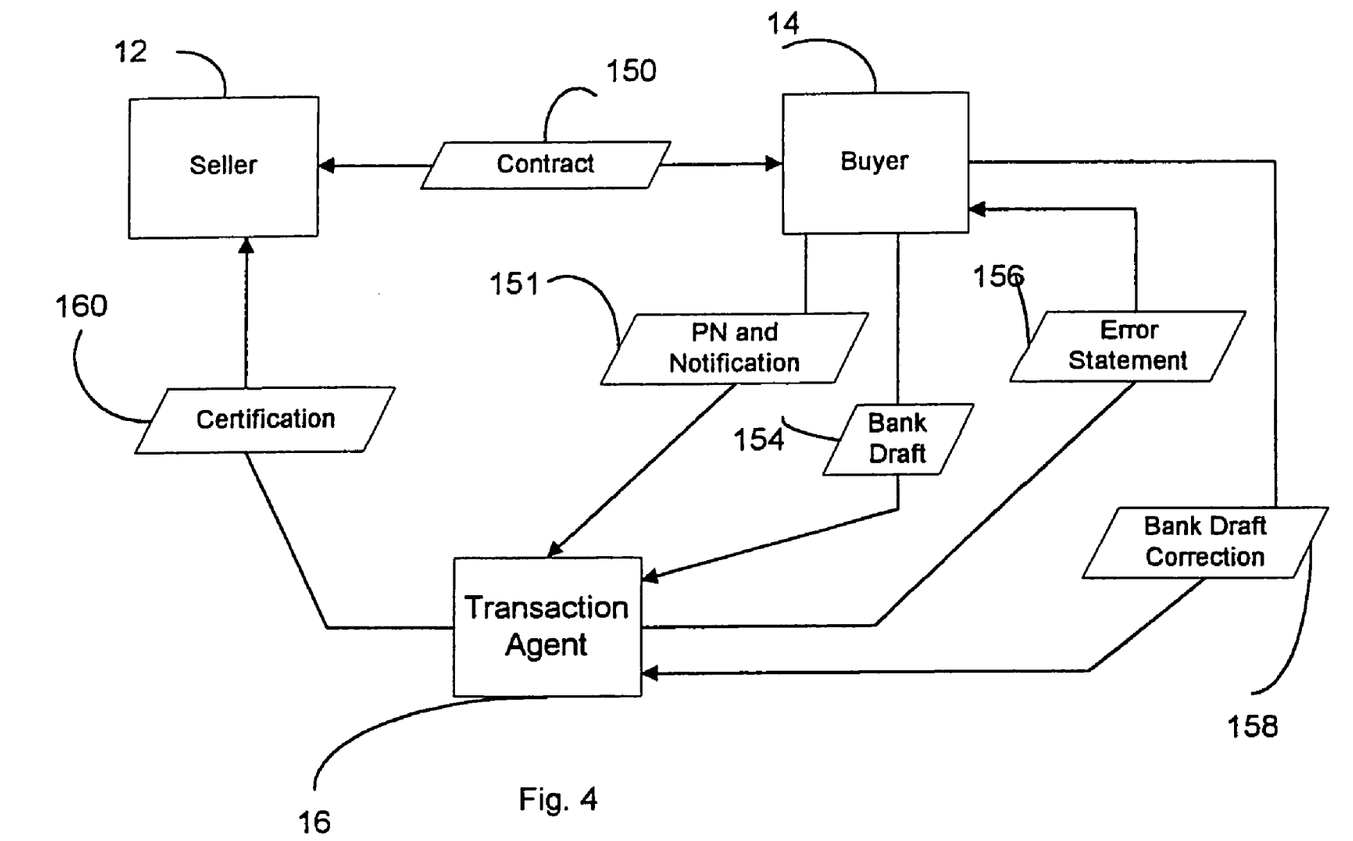
FIG. 4 is a schematic diagram of information that is transferred between parts of FIG. 1 during the certification step of FIG. 2.

FIG. 4 is a schematic diagram of information that is transferred between parts of FIG. 1. This information is passed from the parts during contract inception and the certification process of the system. The information includes a contract 150, a PN and a notification generally indicated together at 151, a bank draft 154, an error statement 156, a bank draft correction 158, and a certification 160. The contract 150 is formed between the seller 12 and the buyer 14. The PN and notification 151, the bank draft 154, and the bank draft correction 158 are sent from the buyer 14 to the transaction agent 16. The error statement 156 is sent from the transaction agent 16 to the buyer 14, and the certification is sent from the transaction agent 16 to the seller 12. Each of these communications is responsive to information that is needed by the receiving party in order to complete the transaction.

The contract 150 is formed between the seller 12 and the buyer 14. The contract 150 may include terms and conditions that are agreed to by both the buyer 14 and seller 12. The terms and conditions of the contract 150 may also include an extended payment period for the buyer 14. The extended payment period can be offered because the issuance of the PN allows the seller 12 to choose to receive liquidity on or about the date of performance of the contract 150, and thus make the payment term less critical to the seller 12.

The PN is a negotiable instrument that is transmitted from the buyer 14 to the transaction agent 16 once the consideration has been received from the seller 12. The PN and the notification 151 may be sent individually to the transaction agent 16. The PN is a promise to pay the value of the PN in settlement of the trade established by the contract 150, and further includes the names of the issuer (the buyer 14) and the holder (the seller 12). The PN is uniquely identified so that if the notification is sent separately, the notification may use such identification to match the documents thereby authenticating these documents. The notification may include such information as receiving documents, quantity, and any commodity taxes due on the consideration. While the PN is a promise to pay, the bank draft 154 is an order to pay.

The bank draft 154 is sent from the buyer 14 to the transaction agent 16 to facilitate the payment obligation of the buyer owed to the interest holders of the CPN. The bank draft 154 includes the amount of money to be withdrawn from the buyer's account, the date on which the amount will be withdrawn, and the relevant account information for the withdrawal. Once the bank draft 154 matures, the transaction agent 16 will collect the money from the buyer's account. If the amount noted in the bank draft 154 does not match the amount called for in the CPNs that will mature on the same day as the bank draft 154, then the error statement 156 is generated and the bank draft correction 158 is issued by the buyer 14.

When the PN and the notification 151 are received by the transaction agent 16, the transaction agent 16 generates the certification 160 that is sent to the seller 12. The certification is the CPN and can include a copy of the PN and the notification 151 so that the seller 12 can update his records.

Figure 5:
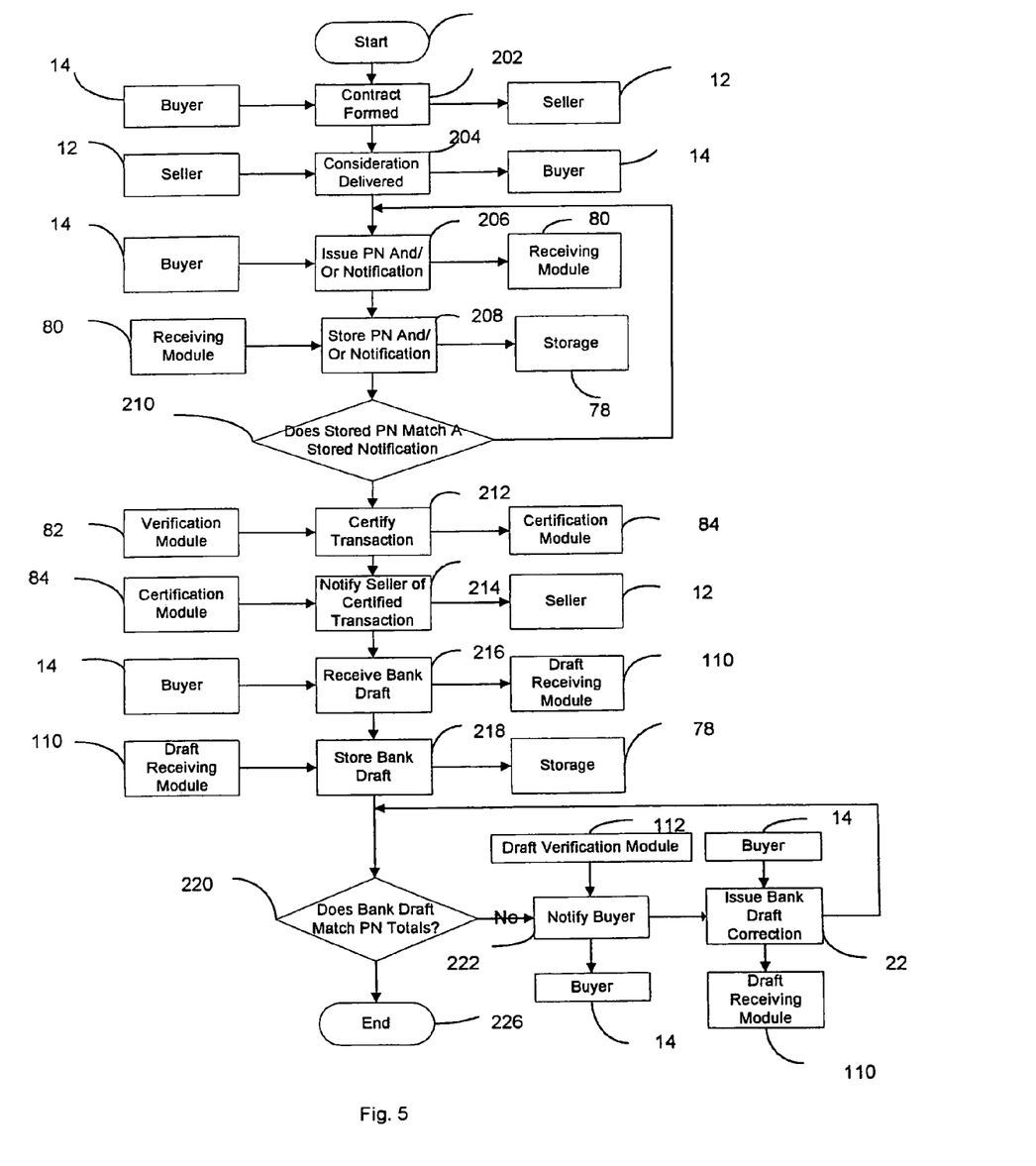
FIG. 5 is a flowchart of the certification step of FIG. 2.

FIG. 5 is a flowchart of the certification step of FIG. 2 and will be described in detail with reference to FIGS. 1 and 3. The method starts in step 200. The contract 150 is formed in step 202 between the buyer 14 and the seller 12. Consideration is delivered in step 204 from the seller 12 to the buyer 14. The buyer 14 then issues a PN and/or the notification in step 206. The PN and/or the notification is received in the receiving module 80 located in the transaction agent 16 of FIG. 3. The receiving module 80 stores the PN and/or the notification in storage 78 in step 208. Step 210 determines whether the stored PN matches any of the stored notifications. If the PN does not match, then the method waits for another PN and/or the notification in step 206.

If the stored PN does match, then the verification module 82 verifies the PN and sends the CPN to the certification module 84 in step 212. The certification module 84 notifies the seller 12 that the PN has been certified in step 214. The buyer 14 sends a bank draft to the draft receiving module 110 of the transaction agent 16 in step 216. The bank draft may be received at the same time as the PN, or may be delivered at some time up to the maturity date of the CPN. The draft receiving module 110 then stores the bank draft in step 218, for example storage 78 of FIG. 3.

Step 220 determines whether the bank draft matches the CPN total for the maturity date. If the total does not match the CPN total, then the draft verification module 112 notifies the buyer 14 in the step 222 that the totals do not match. The buyer 14 then issues a bank draft correction in step 224 that is received by the draft receiving module 110. The verification module 112 then checks the totals again in step 220, and if the totals match, then the method ends in step 226.

The buyer 14 may have issued many PNs that mature on the same date. The buyer 14 may then produce a single bank draft for all such PNs that mature on the same day. In this manner, the buyer 14 may minimize any transactions fees imposed by its bank by settling many trades with the draft. Although the bank draft facilitates the collection step, the transaction agent 16 does not have to receive the bank draft before liquidating the CPN 152.

Figure 6:
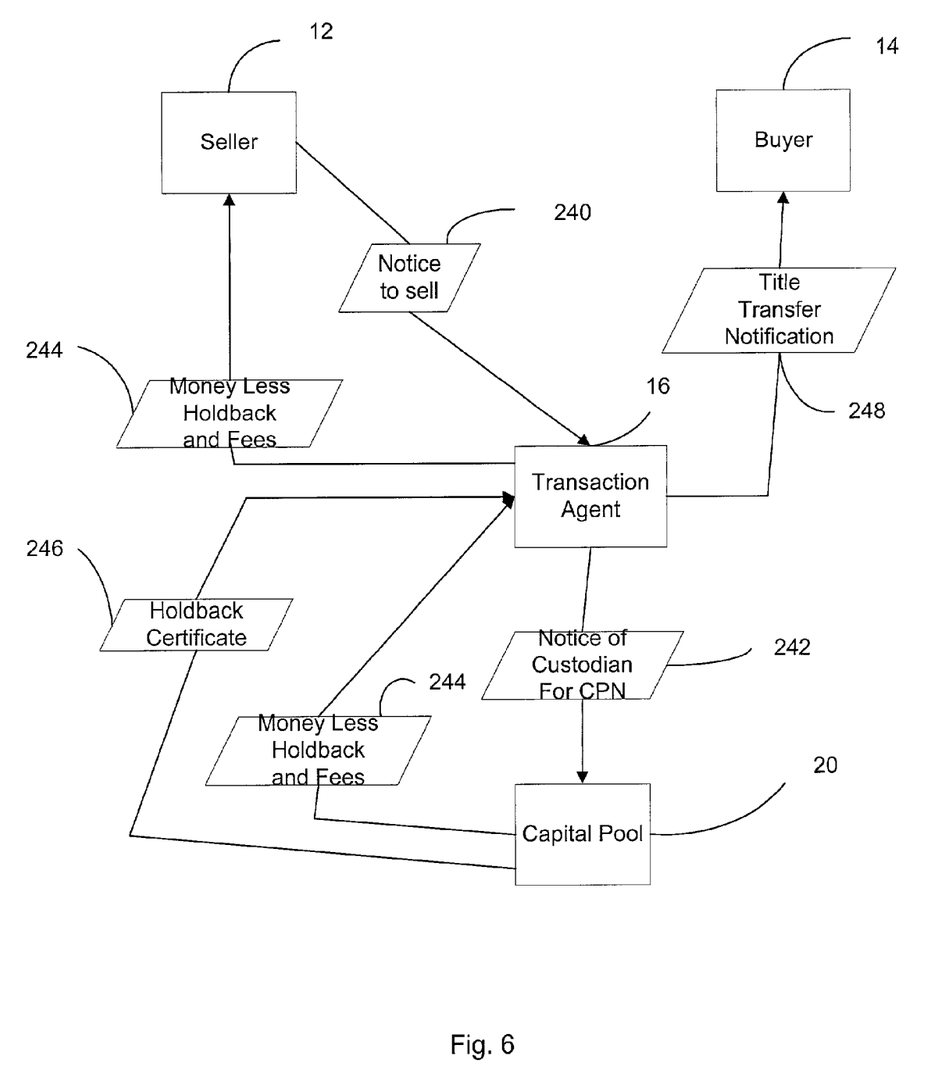
FIG. 6 is a schematic diagram of information that is transferred between parts of FIG. 1 during the liquidation step of FIG. 2.

FIG. 6 is a schematic diagram of information that is transferred between parts of FIG. 1 during the liquidation step of FIG. 2. The information includes a notice to sell 240, a notice of custodian for the CPN 242, money less holdback and fees 244, a holdback certificate 246, and a title and interest transfer notification 248. The seller 12 sends the notice to sell 240 to the transaction agent 16. The transaction agent 16 sends the capital pool 20 the notice of custodian for the CPN 242. The capital pool purchases or acquires an interest in the CPN from the seller facilitated by the transaction agent 16 and returns money less holdback and fees 244 and the holdback certificate 246 to the transaction agent 16 which acts on behalf of the seller 12. The money less holdback and fees 244 are then forwarded to the seller 12 from the transaction agent 16, which, if required, then notifies the buyer 14 that the title has been transferred in the title transfer notification 248.

The capital pool's fees that are taken from the sale or transfer of an interest in the CPN represent the finance cost and profit to the capital pool 20. The amount of the fees may vary depending on the buyer 14 and seller 12. The holdback is used as collateral for performance by the buyer. The transaction agent 16 may also take a fee from the money that is sent to the seller 12. The holdback certificate 246 represents a subordinated interest on the part of the seller 12 in the liquidated CPN. This certificate 246 is likewise stored in the storage 78 of the transaction agent 16 to be collected upon by the seller 12 when the maturity date arrives.

Figure 7:
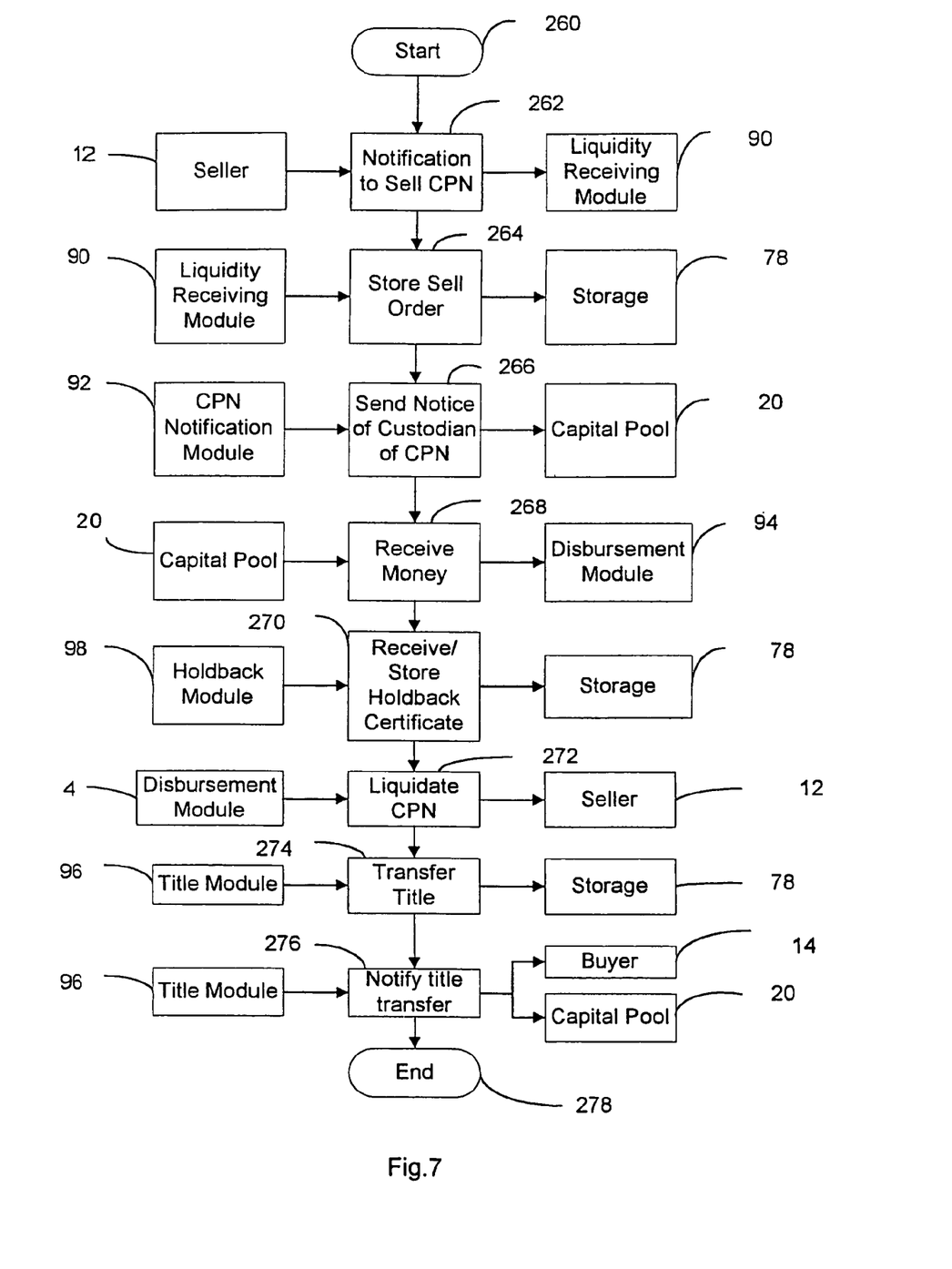
FIG. 7 is a flowchart of the liquidation step of FIG. 2.

FIG. 7 is a flowchart of the liquidation step of FIG. 2 and will be described in detail with reference to FIGS. 1, 3 and 6. The method begins in step 260. The seller 12 sends a notification to sell an interest in the CPN to the liquidity receiving module 90 in step 262. The liquidity receiving module 90 stores the sell order 240 in storage 78 in step 264. Once the sell order 240 is received then the CPN notification module 92, if required, sends the notice of custodian 242 to the capital pool 20 in step 266. The disbursement receiving module 94 receives money from the capital pool 20 for the CPN in step 268. The amount of money paid by the capital pool 20 to the seller is net of the fees charged by the capital pool and also less any holdback.

The hold-back is received and stored at step 270 in storage 78 by the holdback receiving module 98. The disbursement module 94 then forwards the money less fees and holdback 244 to the seller 12, thus liquidating the CPN in step 272. After the CPN is liquidated, and, if required, the title of the CPN is transferred from the seller 12 to the capital pool 20 in step 274 by the title and interest transfer module 96, the CPN is then replaced in storage 78. The title transfer module 96 then sends a notification of title transfer 248 to both the buyer 14 and capital pool 20 in step 276, if required. The method ends in step 278.

The process of liquidation provides the seller 12 with a means of collecting all or a portion of a claim against a buyer 14 on or about the date of seller's performance. This enhanced liquidity allows the seller 12 to benefit financially. Also, because his cost for extending terms to a buyer 14 is diminished, the seller 12 may extend those terms to the buyer 14. Thus the buyer 14 can use additional time to generate the revenue to pay the obligation under the PN.

The liquidation process is facilitated by the PN. The PN is a promise made by the buyer 14 to pay the amount stated. The seller 12 is not forced to find a source of funding based on his receivables account, but can instead use the CPN as a source of liquidity. The buyer 14 is obligated to pay pursuant to the PN, regardless of any claims of merchantability, express or implied warranties, or any change in business status of the seller 12. The system therefore enables the capital pool 20 to purchase the CPN primarily based on the financial strength of the buyer 14, and only to a limited extent on the financial strength of the seller 12.

For example, a small farmer (seller 12) regularly sells produce to a large supermarket chain (buyer 14). The chain can issue a PN to the farmer which the farmer can then sell in the form of an interest in the CPN to the capital pool 20. The capital pool 20 does not have to risk business fluctuations that may effect the small farmer, but instead bases its decision to purchase the CPN based primarily on the strength of the supermarket chain. Thus, the system has transformed the financing of the trade from a loan on accounts receivable of a small farmer to a purchase of an interest in a certified negotiable instrument issued by a credit-worthy supermarket chain. The capital pool 20 can provide liquidity over and above the amount provided by conventional alternatives because the capital pool 20 will derive its security based primarily upon the future performance by the buyer of its obligations under the PN. The buyer 14 receives the extended terms for the trade and is able to generate the required revenue to pay for the PN.

Figure 8:
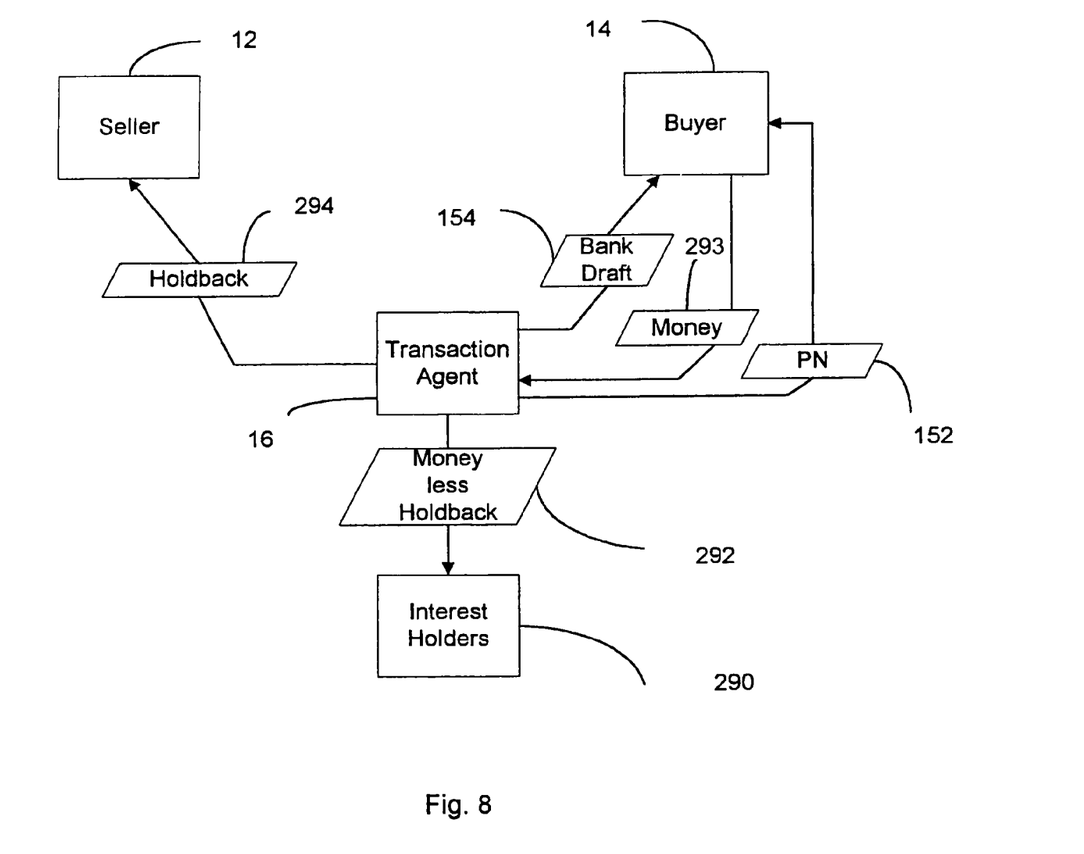
FIG. 8 is a schematic diagram of information that is transferred between parts of FIG. 1 during the collection step of FIG. 2.

FIG. 8 is a schematic diagram of information that is transferred between parts of FIG. 1 during the collection step of FIG. 2 and will be discussed with respect to these figures. The information includes interest holders 290 of the CPN, the bank draft 154, the money 293 from the buyer's account, and the PN 152. The transaction agent 16 sends the bank draft 154 to the buyer's bank who then sends the money 293 to the transaction agent 16. On behalf of the buyer 14, the transaction agent 16 then forwards the money less holdback 292 to retire the buyer's obligations due to interest holders 290, and, on behalf of the capital pool, the transaction agent 16 may distribute the holdback 294 to the seller 12. Once the money has been distributed, then the transaction agent 16 may return the PN 152 to the buyer 14.

The interest holders 290, for example, may be members of the capital pool 20 who purchased the CPN or an interest in the CPN during the liquidation step. The interest holders 290 may fully own the PN 152, in which case the title and interest transfer module 96 would have updated the title of the PN 152 to reflect this ownership. Or, the interest holders 290 may only own a portion of the PN 152, in which case the collection module 76 would distribute the money on the maturity date based on the partial ownership of the PN 152.

Figure 9:
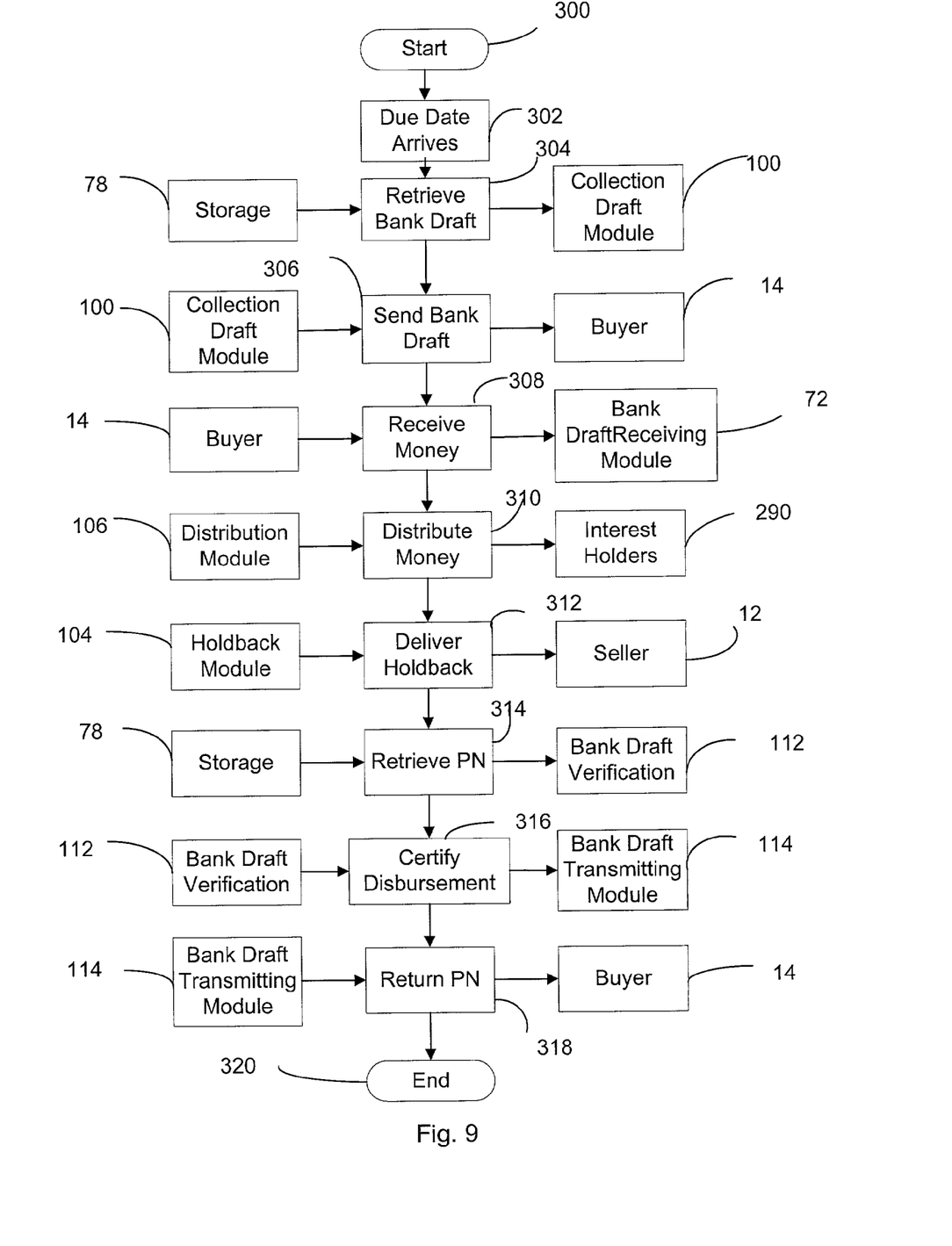
FIG. 9 is a flowchart of the collection step of FIG. 2.

FIG. 9 is a flowchart of the collection step of FIG. 2 and will be described in detail with reference to FIGS. 1 and 3. The method starts at step 300. The due date arrives in step 302. The bank draft is retrieved from storage 78 and sent to the collection draft module 100 in step 304. The collection draft module 100 sends the bank draft to the buyer's bank in step 306. The buyer's bank then sends the money 293 to the bank draft receiving module 72 in step 308. Once the transaction agent 16 has received the money 293, the distribution module 106 of the collection module 76 distributes the money less holdback 292 to the interest holders 290 in step 310. The holdback is delivered to the seller 12 in step 312 by the holdback module 104 of the transaction agent 16 on behalf of the capital pool 20. Once the money has been disbursed, the PN is retrieved from storage 78 and sent to the bank draft verification module 112 in step 314. The bank draft certification module 112 certifies that the disbursement has satisfied all obligations of the buyer 14 in step 316, and forwards the certified paid PN to the bank draft transmitting module 114. The bank draft transmitting module 114 then returns the PN to the buyer 14 in step 318, and the method ends in step 320.

The collection method is processed by the transaction agent 16. This process allows the buyer 14 and the seller 12 to minimize their participation in the accounts payable and accounts receivable departments, respectively. The seller 12 is not waiting for an outstanding balance to be forwarded to him because he had liquidated the transaction during the liquidation process. The buyer does not have to keep track of the transaction in the accounts payable department because he had finalized his payment of the transaction when he had made the promise to pay in the PN 152. The buyer 14 then was able to control the payment of the transaction the day the goods arrived, or the services were delivered, instead of having to wait for invoices and processing the invoices against docking slip, receivables, etc., and thus the buyer's control of the process is increased.

The above description and accompanying drawings are illustrative in nature. One of ordinary skill in the art can recognize various changes or modifications that may be made without departing from the scope of the present invention.

The invention claimed is:

1. An apparatus for providing liquidity to a seller who has provided value to a buyer, said apparatus comprising:
   a receiving module configured to:
      receive a notification defining information pertaining to the provided value, which has resulted in a negotiable instrument issued by the buyer intended for the seller; and
      receive the negotiable instrument issued by the buyer intended for the seller, said negotiable instrument having an extended maturity date; and
   a calling module configured to:
      upon receipt by the receiving module of the negotiable instrument issued by the buyer intended for the seller, call upon a capital pool to purchase an interest in said negotiable instrument; and
   send a portion of the value of said negotiable instrument to the seller prior to said extended maturity date.

2. The apparatus as defined in claim 1 wherein said notification further comprises an indication of the amount of commodity taxes.

3. The apparatus as defined in claim 1 wherein said receiving module is configured to receive said notification and said negotiable instrument directly from the buyer.

4. The apparatus as defined in claim 1 further comprising a verification module configured to verify that said negotiable instrument and said notification are responsive to the receipt of the value by the buyer.

5. The apparatus as defined in claim 1 wherein said negotiable instrument is a promissory note.

6. The apparatus as defined in claim 5 wherein said promissory note is certified to be responsive to receipt of the value.

7. The apparatus as defined in claim 6 wherein said certified promissory note is electronically certified.

8. The apparatus as defined in claim 7 wherein said electronically certified promissory note is digitally certified.

9. The apparatus as defined in claim 1 further comprising storage configured to store said negotiable instrument and said notification.

10. The apparatus as defined in claim 1 further comprising a collection module configured to collect the value of said negotiable instrument from the buyer.

11. The apparatus as defined in claim 10 wherein said collection module is configured to receive an order to pay.

12. The apparatus as defined in claim 11 wherein said order to pay is a bank draft.

13. The apparatus as defined in claim 12 wherein said collection module is configured to verify that said bank draft is for the value of said negotiable instrument.

14. The apparatus as defined in claim 13 wherein said collection module is configured to distribute the value of said negotiable instrument received from said bank draft to interested holders of said negotiable instrument.

15. A method for providing liquidity to a seller who has provided value to a buyer, said method comprising the steps of:
receiving a notification defining information pertaining to the provided value, which has resulted in a negotiable instrument issued by the buyer intended for the seller;
receiving the negotiable instrument issued by the buyer intended for the seller, said negotiable instrument having a maturity date; and
calling upon a capital pool to:
purchase an interest in said negotiable instrument; and
send the seller a portion of the value of said negotiable instrument prior to said maturity date.

16. The method as defined in claim 15 further comprising the step of verifying that said negotiable instrument and said notification are responsive to the receipt of the value.

17. The method as defined in claim 15 wherein said negotiable instrument is a promissory note.

18. The method as defined in claim 17 further comprising the step of certifying that said promissory note is responsive to the receipt of the value.

19. The method as defined in claim 18 wherein said certifying step electronically certifies said promissory note.

20. The method as defined in claim 19 wherein said electronically certified promissory note is certified digitally.

21. The method as defined in claim 15 wherein said receiving steps receive said negotiable instrument and said notification directly from the buyer.

22. The method as defined in claim 15 further comprising the step of storing said negotiable instrument and said notification.

23. The method as defined in claim 15 further comprising the step of collecting the value of said negotiable instrument from the buyer.

24. The method as defined in claim 23 wherein said collecting step comprises receiving an order to pay issued by the buyer.

25. The method as defined in claim 24 wherein said order to pay is a bank draft.

26. The method as defined in claim 23 wherein said collecting step comprises verifying said order to pay is for the value of said negotiable instrument.

27. The method as defined in claim 26 further comprising the step of distributing the value of said negotiable instrument to interested holders of said negotiable instrument.

28. An apparatus for providing liquidity to a seller having provided value to a buyer, said apparatus comprising:
a receiving module configured to:
receive a notification defining information pertaining to the provided value, which has resulted in a negotiable instrument issued by the buyer intended for the seller; and
receive the negotiable instrument issued by the buyer intended for the seller, said negotiable instrument having a maturity date on a future date and being redeemable from the buyer;
a calling module configured to:
call upon a capital pool to purchase an interest in said negotiable instrument; and
send a portion of the value of said negotiable instrument to the seller prior to said maturity date; and
a disbursement module for transmitting money received from the capital pool, arising from the capital pool agreeing to purchase an interest in said negotiable instrument, to the seller, such that said amount of money is a portion of the value of said negotiable instrument.

29. The apparatus as defined in claim 28 further comprising storage configured to store said negotiable instrument.

30. The apparatus as defined in claim 28 wherein said negotiable instrument is received over a network.

31. The apparatus as defined in claim 30 wherein said network is the Internet.

32. The apparatus as defined in claim 28 wherein said negotiable instrument is a promissory note.

33. The apparatus as defined in claim 32 wherein said promissory note is responsive to receipt of the value.

34. The apparatus as defined in claim 33 wherein said promissory note is electronically certified.

35. The apparatus as defined in claim 34 wherein said electronically certified promissory note is digitally certified.

36. The apparatus as defined in claim 28 further comprising a collection module configured to collect the value of said negotiable instrument from the buyer.

37. The apparatus as defined in claim 36 wherein said collection module is configured to receive an order to pay.

38. The apparatus as defined in claim 37 wherein said order to pay is a bank draft.

39. The apparatus as defined in claim 38 wherein said collection module is configured to verify that said bank draft is for the value of said negotiable instrument.

40. The apparatus as defined in claim 39 wherein said collection module is configured to distribute the value of said negotiable instrument received from said bank draft to interested holders of said negotiable instrument.

41. A method for providing liquidity to a seller having provided consideration to a buyer, said method comprising the steps of:
transferring a negotiable instrument issued by the buyer to the seller for the value, said negotiable instrument having a maturity date on a future date and being redeemable from the buyer;
purchasing said negotiable instrument from the seller by calling upon a capital pool; and
tendering an amount of money to the seller such that said amount of money is a portion of the value of said negotiable instrument.

42. The method as defined in claim 41 further comprising the step of storing said negotiable instrument.

43. The method as defined in claim 41 wherein said receiving step receives said negotiable instrument over a network.

44. The method as defined in claim 43 wherein said network is the Internet.

45. The method as defined in claim 41 wherein said negotiable instrument is a promissory note.

46. The method as defined in claim 45 further comprising the step of certifying that said promissory note is responsive to the receipt of the value.

47. The method as defined in claim 46 wherein said promissory note is electronically certified.

48. The method as defined in claim 47 wherein said electronically certified promissory note is digitally certified.

49. The method as defined in claim 41 further comprising the step of collecting the value of said negotiable instrument from the buyer.

50. The method as defined in claim 49 wherein said collecting step comprises receiving an order to pay.

51. The method as defined in claim 50 wherein said order to pay is a bank draft.

52. The method as defined in claim 51 wherein said collecting step comprises verifying said bank draft is for the value of said negotiable instrument.

53. The method as defined in claim 52 further comprising the step of distributing the value of said negotiable instrument received from said bank draft to interested holders of said negotiable instrument.

* * * * *